United States Patent [19]
Le Rouzic et al.

[11] Patent Number: 5,289,763
[45] Date of Patent: Mar. 1, 1994

[54] DEVICE FOR THE EXTRACTION OF JUICE AND PULP FROM FRUIT AND VEGETABLES

[75] Inventors: Claude Le Rouzic, Montceau Les Mines; André Gateaud, Perrecy Les Forges; Michel Fleche, Blanzy, all of France

[73] Assignee: Robot Coupe (S.A.), Montceau Les Mines, France

[21] Appl. No.: 401,313

[22] Filed: Aug. 31, 1989

[51] Int. Cl.⁵ .................. A23N 1/00; A23N 1/02
[52] U.S. Cl. ............................. 99/503; 99/501; 99/511; 99/513; 366/314
[58] Field of Search ............... 99/495, 509–513; 366/314; 494/43, 56; 241/92, 37.5; 210/360.1, 369

[56] References Cited

U.S. PATENT DOCUMENTS

| | | | |
|---|---|---|---|
| 1,697,618 | 1/1929 | Strite et al. | 99/513 |
| 2,289,656 | 7/1942 | Knapp | 99/512 |
| 2,297,880 | 10/1942 | Fredrickson | 99/512 |
| 2,440,425 | 4/1948 | Williams | 99/513 |
| 2,481,010 | 9/1949 | Gundelfinger | 99/512 |
| 2,481,848 | 9/1949 | Lapps | 99/511 |
| 2,533,811 | 12/1950 | Jepson | 99/513 |
| 2,757,696 | 8/1956 | Billard | 99/511 |
| 3,100,009 | 8/1963 | Drachenberg | 99/511 |
| 4,702,162 | 10/1987 | Sontheimer | 210/360.1 |
| 4,840,119 | 6/1989 | Caldi | 494/43 |

FOREIGN PATENT DOCUMENTS

| | | | |
|---|---|---|---|
| 284332 | 11/1952 | Switzerland | 99/511 |
| 746496 | 3/1956 | United Kingdom | 99/513 |

Primary Examiner—Timothy F. Simone
Attorney, Agent, or Firm—Thomas A. O'Rourke

[57] ABSTRACT

An apparatus for extracting juice and pulp from vegetables and fruits is provided having a base containing an electric motor, and a bowl removably attached to the base. The motor has a drive shaft which projects into the interior of the bowl for receiving process tools. The bowl is provided with a strainer which is equipped with a skirt which fits inside the central tube surrounding the drive shaft. The driving shaft has a spindle fitted thereon in two orientations, one in which the strainer remains static during operation and one in which the strainer is driven rotationally when the driving shaft is turning.

6 Claims, 9 Drawing Sheets

DEVICE FOR THE EXTRACTION OF JUICE AND PULP FROM FRUIT AND VEGETABLES

BACKGROUND OF THE INVENTION

The invention described herein is directed to a device for obtaining juice from fruit and vegetables, that is to say for extracting the essential juices from such with a view to human consumption either directly, or in the form of sorbet ice, jelly, sauce, jam, puree and so on, and intended specifically but not exclusively for fitting to a household appliance of the type known as a food-processor.

DESCRIPTION OF THE PRIOR ART

The extraction of juice from fruits has been carried out from time immemorial. In the case of grapes and apples this is done in a wine or cider press in which the fruit is pressed by a board against a grid serving as a strainer, the board being moved by a screw drive.

In the case of citrus fruits, another known method of extraction is to cut the lemon or orange in two and to press the cut half thus obtained against a cone. A citrus fruit squeezer of this type is described notably in FR-A-2 459 031.

Also known, and described in FR-A-80 00375 (GELB), is a rotor device for the extraction of fruit juices particularly intended for use with berries. In the case of this device, the rotor turns at high speed inside a cylindrical, fixed and horizontal strainer. The rotor projects the fruit against this strainer, causing its disintegration, leaving the juice to pass through the strainer.

Also known, notably in FR-A-2 129 193 (VERDUN) are centrifugal devices in which the strainer rotates; here, the separation of juice and pulp is effected by centrifugal force. Unfortunately, in centrifugal devices of this type the pips or stones within certain fruits are partly crushed, causing the retention of a certain degree of unpalatable bitterness in the taste of the juice.

However, each of the devices mentioned above carries out relatively well its intended task only for a specific category of fruit or vegetable.

SUMMARY OF THE INVENTION

One aim of the invention described herein is the definition of a device for the processing of all fruits and vegetables with a view to extraction of the edible parts.

According to this invention, the apparatus for extraction of juice and pulp from vegetable and fruit products comprises a supporting base enclosing an electric motor, a process bowl fitted onto this base so as to be removable and in such a way so as to ensure that the driving shaft from the motor projects into the interior of the bowl, said shaft being surrounded by a central tube. Also provided are a lid capable of being fixed in position and closing the above-mentioned bowl and a vertical strainer whose sides are parallel to the cylindrical interior of the process bowl and having as a characteristic feature a skirt inserted within the central tube surrounding the driving shaft but without touching the latter.

The strainer is never driven directly by the driving shaft. It is therefore possible to use the device either as a fruit press or as a centrifugal separator using an appropriate assembly according to the nature of the item to be processed.

According to the type of fruit or vegetable to be processed, the rotary tool used may be either a rotor revolving within a fixed strainer, or a grater driven rotationally along with the strainer. The rotary tool may also be a conical citrus fruit squeezer attached to the driving shaft.

It is a further characteristic feature of this invention described herein that the bottom of the bowl is not horizontal but slopes toward an outlet conduit for draining the juice.

According to the invention described herein residual fruit stalks and waste material such as skin and pips remain within the strainer, and this causes no particular difficulty in the context of the domestic applications for which this device is intended once the pulp and juice have been extracted. The apparatus as a whole is of course designed to be easy to assemble and to maintain in good condition. Using this device, it is possible to obtain for immediate consumption, juice, puree or paste from fruits and vegetables possessing hitherto unknown flavors. This is because in the context of industrial processes aiming to reduce oxidation, preservatives degrade the natural taste of the product.

A further distinctive feature of this invention that is the press for extraction of vegetable and fruit juice, comprises a supporting base enclosing an electric motor whose driving shaft projects into the interior of a bowl. The press is fitted so as to be removable on the supporting base and closed with a lid fitted in such a manner as to be removable from the bowl. Different tools may be fitted in turn onto the driving shaft on the motor. The press is characterized by the inclusion of a fixed cylindrical strainer and a rotor possessing at least one blade whose outer edge extends to a point close to the strainer. The rotor blades are preferably articulated on the hub.

The invention described herein also concerns an automatic positioning device for a component rotating on a driving shaft and intended specifically but not exclusively for household appliances.

The fitting of tools onto the driving shaft can be effected using various means such as nuts, clips, or spring catches. It is imperative that tools turning at high speed should be firmly attached to the driving shaft. Indeed, it is particularly the case with household appliances usually used by housewives without any particular technical qualifications that the fitting of the various tools to the driving shaft should be as simple as possible. This consideration holds particularly true when it is a matter of fitting not a simple tool possessing a hub of appropriate shape, but a more complex assembly comprising two or more components operating in conjunction with one another, as is the case, for example, in centrifugal devices.

The invention described herein has also as one of its objectives the remedying of the disadvantages of known fastening devices by making possible the automatic positioning of a rotary component at a given level on a driving shaft. It is also intended to provide a device to position automatically a strainer on a driving shaft by means of a spindle whose internal profile fits the external profile of the driving shaft. The rotary component of the spindle is clipped on to the spindle, and features on the strainer a hub with a thread in the same direction as that of the rotation of the driving shaft. The spindle also possesses a thread of the same orientation as that of the rotation of the driving shaft, the outside diameter of which corresponds to the inside diameter of the tapped hub, the whole being fitted inside a bowl possessing a central tube whose inside diameter is greater than that of the outside diameter of the hub.

It is a further characteristic feature of this invention that the upper section of the central tube possesses a series of ribs forming between them slots into which the ribs on the rotary component fit.

In this way, the housewife simply places a rotary component inside the process bowl with its ribs fitting into the grooves of the central tube and then simply puts the spindle inside the rotary component. The rotary movement of the motor will then position appropriately the different elements of the assembly.

In effect, the spindle placed on the driving shaft pulls onto the latter and is driven rotationally in the same direction as the motor. As a consequence of this rotation, the spindle enters the hub of the rotary component, continuing until it comes up against the bottom of the central tube. It then continues turning but now without further movement along the axis of the driving shaft. After this, the hub of the rotary component screws onto the spindle, causing an on-axis displacement and the raising of the component to a point where spring catches attach it to the spindle.

When the process operation is at an end, and with the motor off, the housewife withdraws the spindle/rotary component assembly and separates them for cleaning.

Other features and advantages of the invention described herein will become apparent in the course of the following description of particular practical implementations of the invention, these being included here only as illustrations and not as an exhaustive list of possible uses; they are intended to be read in conjunction with the included drawings:

DETAILED DESCRIPTION OF THE INVENTION

Figure 1:
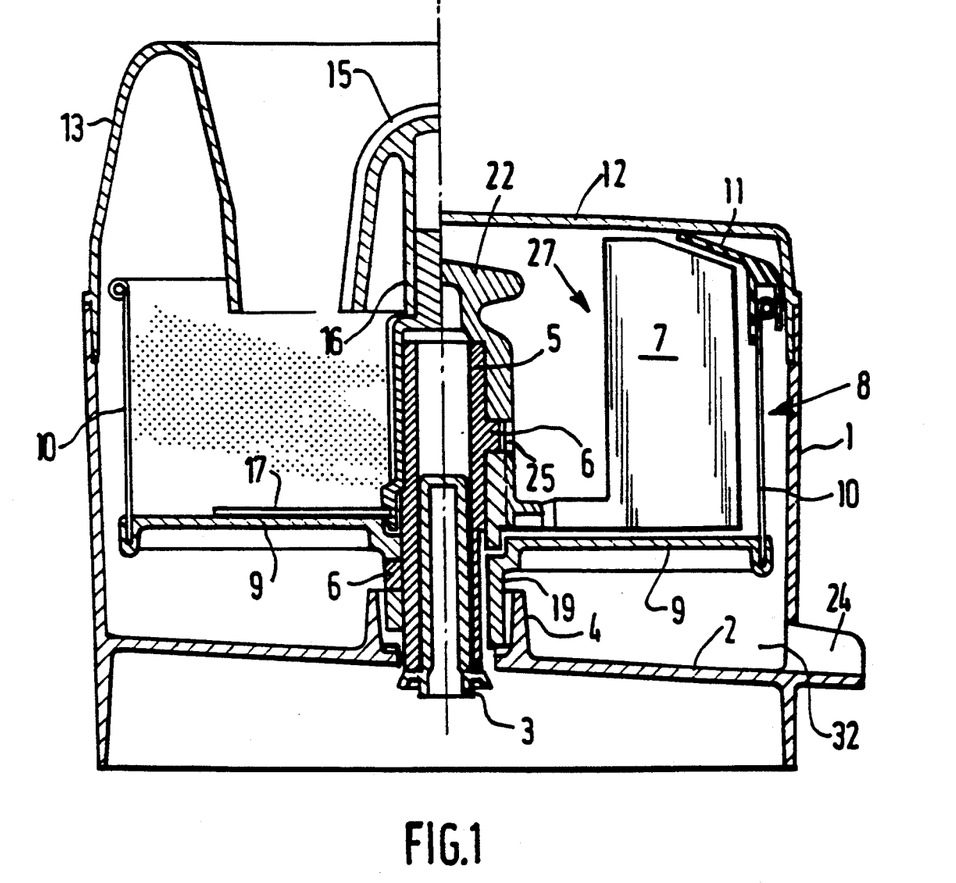
FIG. 1 comprises two juxtaposed half-sections of the device as used, on the right, for pressing fruit and as used, on the left, for centrifugal extraction of juice and citrus fruit squeezer.

As seen in FIG. 1 the device comprises a process bowl (1) intended for removable attachment to a supporting base (not shown) enclosing the motor by means either of spring catches or bayonet fitting. The bottom of the bowl (2) is sloped in the direction of an outlet spout (24) at an angle of a few degrees. In FIG. 1, this slope has been substantially increased in order to aid comprehension. Also to be seen in FIG. 1 is the driving shaft (3) to which a rotary motion of variable speed is imparted by the motor (not shown).

This shaft (3) projects into the interior of the bowl through a tube (4) forming a baffle preventing liquid and pulp extracted from the fruit or vegetables from flowing down the drive shaft (3). Onto this shaft (3), whose outer cross-section has a profile which is either polygonal or circular with one flat side, is fitted an spindle (5). The tools used for juice extraction are themselves fitted to this spindle (5). These comprise components dependent on the operation concerned: either a rotor (7) and a static strainer (10), or the same strainer (10) now able to be driven rotationally, a grater (17) and, if appropriate, a conical juice squeezer (15). In order to allow these tools to be driven without slippage, the spindle (5) possesses a series of studs or pins (6) of which only one is shown in FIG. 1 in the two positions possible. The strainer (10) may consist, for example, of a hollow cylinder in which have been drilled holes of dimensions appropriate to the operation to be performed and which may be, for instance, circular holes 1 mm in diameter.

It is a characteristic feature of this invention that the spindle (5) may be fitted and fastened with spring catches to shaft (3) in two different positions. The first position is shown on the right of FIG. 1 and in FIG. 2. In this position, the spindle (5) drives a rotor rotationally (7), the latter being equipped with small blades turning inside a static cage (8) comprising a bottom disk (9) and a vertical cylindrical component possessing a strainer grid (10) over at least part of its surface area and a seal fitted to the upper section of the strainer (10), said seal being in contact with the inner surface of the lid (12). The lid (12) of course possesses a funnel, to be described later, for introduction of fruit or vegetables.

Figure 2:
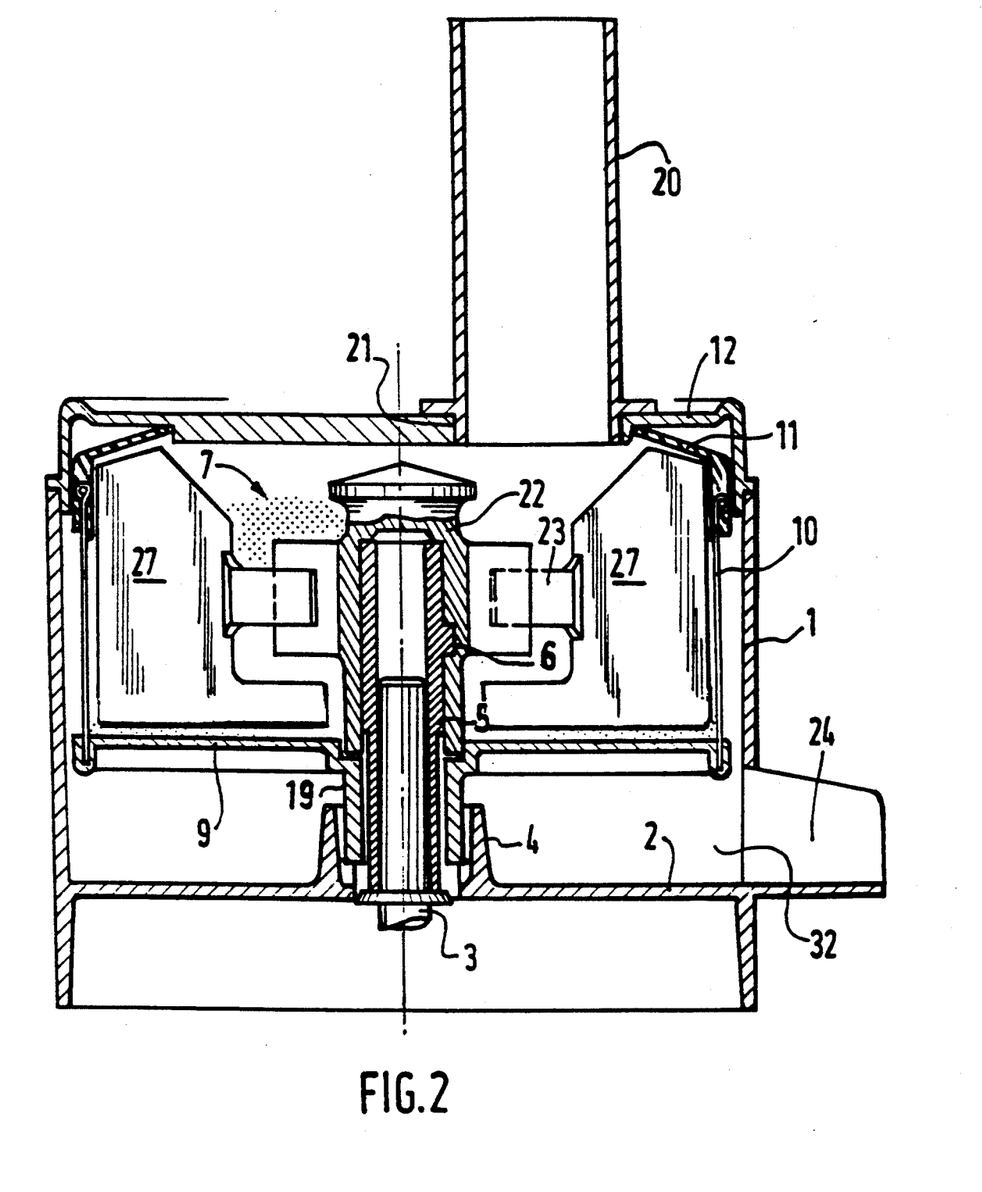
FIG. 2 comprises a vertical section of the device assembled for use as a fruit juice extractor of press type.

When the device is used as a fruit juice extractor of press type, the hub or skirt (19) of the disk (9) is fitted inside the central tube (4) but is not driven by the motor shaft (3). The strainer (10) therefore remains static. However, the process tool (7) is driven rotationally by the spindle (5), whose pins (6) fit into the openings of the bayonet fastening system on the hub (22) of rotor (7). It is therefore driven at the rotational speed of the motor.

On the left of FIG. 1, the spindle (5) has been turned around from the position it occupied on the righthand side of the same Figure, that is: the pins or studs (6) are now on the lower side of spindle (5) and in practice just above the level of the central tube (4). They slot into the skirt or hub (19) of the disk (9). Thus the spindle (5) drives the disk rotationally (9) and, in consequence, the juice strainer (10).

Naturally, the seal (which is not shown) must now be lowered so that it is no longer pressing against the lid. On the left of FIG. 1, the lid (13) can be seen to have a shaped funnel (14) and, in the center, a fruit squeezer of conical type (15) which is attached by means of a skirt (16) onto the upper section of spindle (5). Of course, the fruit squeezer cone (15) is also driven rotationally by the motor and allows the pulp inside the citrus fruit to be drained off along with the seeds or pips, this pulp falling on to the disk/grater (17), which is firmly attached to the bottom disk (9) from which position it is ejected under centrifugal impetus onto the strainer (10) which filters off the juice.

Therefore, according to the type of fruit or vegetable to be processed, the spindle (5) is fitted in one or other of these positions, the position determining whether or not the strainer (10) is driven rotationally. It should preferably be attached by means of spring catches or clips to the shaft (3).

In this practical implementation, the device possesses two distinct lids. The lid at (12) (on the right of FIG. 1) is used when fruit or vegetables are being pressed or when their juice is to be extracted centrifugally. The second lid (13) (on the left of FIG. 1) is used only where the juice of citrus or like items is to be extracted by means of cone "squeezer" (15).

FIG. 2 shows the device as intended for use in "fruit-press" mode. Once again in this Figure can be seen the process bowl (1), the bowl bottom (2) sloping toward outlet (24) for draining off the juice, the driving shaft (3), along with the strainer (10) supported on a disk (9) and possessing on its upper side a seal (11) pressing against the interior surface of lid (12). Where the apparatus is being used as a fruit press and in accordance with the described invention, the strainer (10) remains immobile. To achieve this, the disk (9) is extended on its bottom side by a skirt (19) which nests firmly within the central tube (4). Of course, the lip seal (11), by virtue of the fact that it is pressed against the inside of lid (12), also prevents movement. In this case it is in its raised position. The speed of such a tool may vary from a few tens of revolutions to approximately three thousand revolutions per minute. Naturally, while in the first of these cases it is the pressure of the blades which is operative, at higher speeds the centrifugal force has its own effect.

As is apparent in FIG. 2, a funnel (20) for introduction of products to be processed projects beyond the upper surface of lid (12) and surrounds an opening (21) in this lid. The inner end of this funnel (20) is situated between the hub (22) of the rotor and its blades (27). A push-in implement (not shown) would of course, when inserted into this funnel, allow the fruit or vegetables to be pushed toward the bottom.

The blades (27) are fitted to the hub (22) by means of fastenings (23) which can be made relatively flexible.

The bottom (2) of bowl (1) includes an outlet conduit (24). The juice or puree of the fruit or vegetables which have been pressed against the strainer (10) will be drained by gravity and flow via this outlet. The items to be pressed are inserted in the funnel (20) after prior slicing or cutting. When rotating, the blades (27) exert pressure on the sliced products, forcing their finer parts through the openings in the strainer grid (10).

Figure 5:
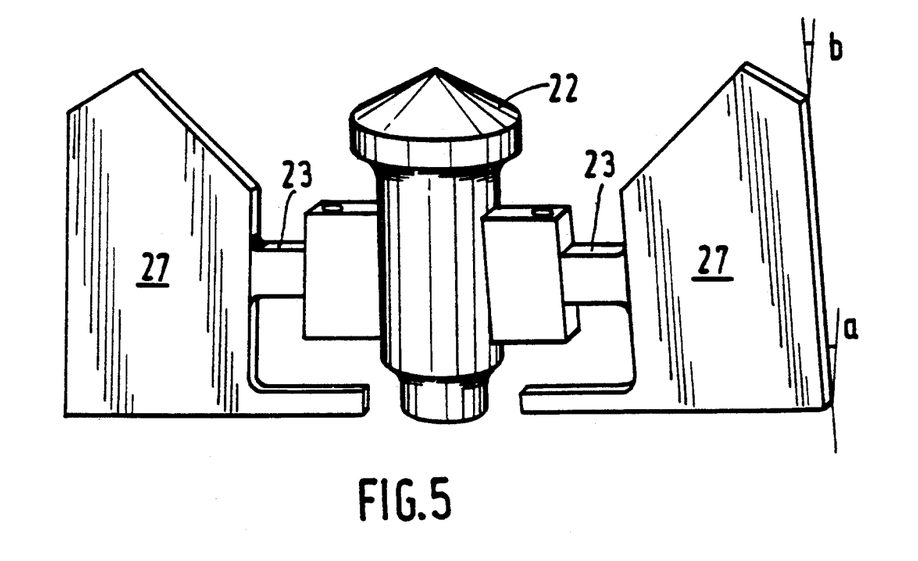
FIG. 5 is a perspective drawing of the rotor.

In the practical implementation shown here, the pin (6) slots into a groove (25) formed inside the hub (22) of the process tool for bayonet-type attachment. FIG. 5 shows the rotor (7) whose components are as described above, that is two blades or lobes (27) attached to a hub (22) by fastenings (23). These fastenings are such so as to allow the rotor (7) to be inserted although its dimensions may be greater than the inside diameter of the seal (11). Depending on the mass of the matter to be processed and the space present between the outer edge of blades (27) and strainer (10), the blades may be angled more or less from their initial position in order to operate in a progressive manner. The construction of the apparatus includes, however, a raking of the blades (27) at an angle (a) of two or three degrees from front to back to ensure that the items to be processed are seized from bottom to top and at an angle (b) from bottom to top in order to avoid accumulation of process matter at the bottom of the bowl. However, the actual size of these angles may vary depending on the products to be processed and the operating speed of the motor.

The fruit or vegetable matter to be processed falls into the bowl (2) onto the rotor blades (27), sliding along the latter under the effect of centrifugal force and are thrown, as it were, against the strainer surface (10), against which it is pressed by the following blade.

In all assembly configurations of this device, a space is formed between the underside of the disk (9) and bottom (2) of the bowl; this space (32), measuring a few centimeters, is present in order to ensure that the rotation either of the process tool or the strainer does not result in formation of a juice emulsion, this being achieved by creating a space in which the juice can "rest" after extraction.

Figure 3:
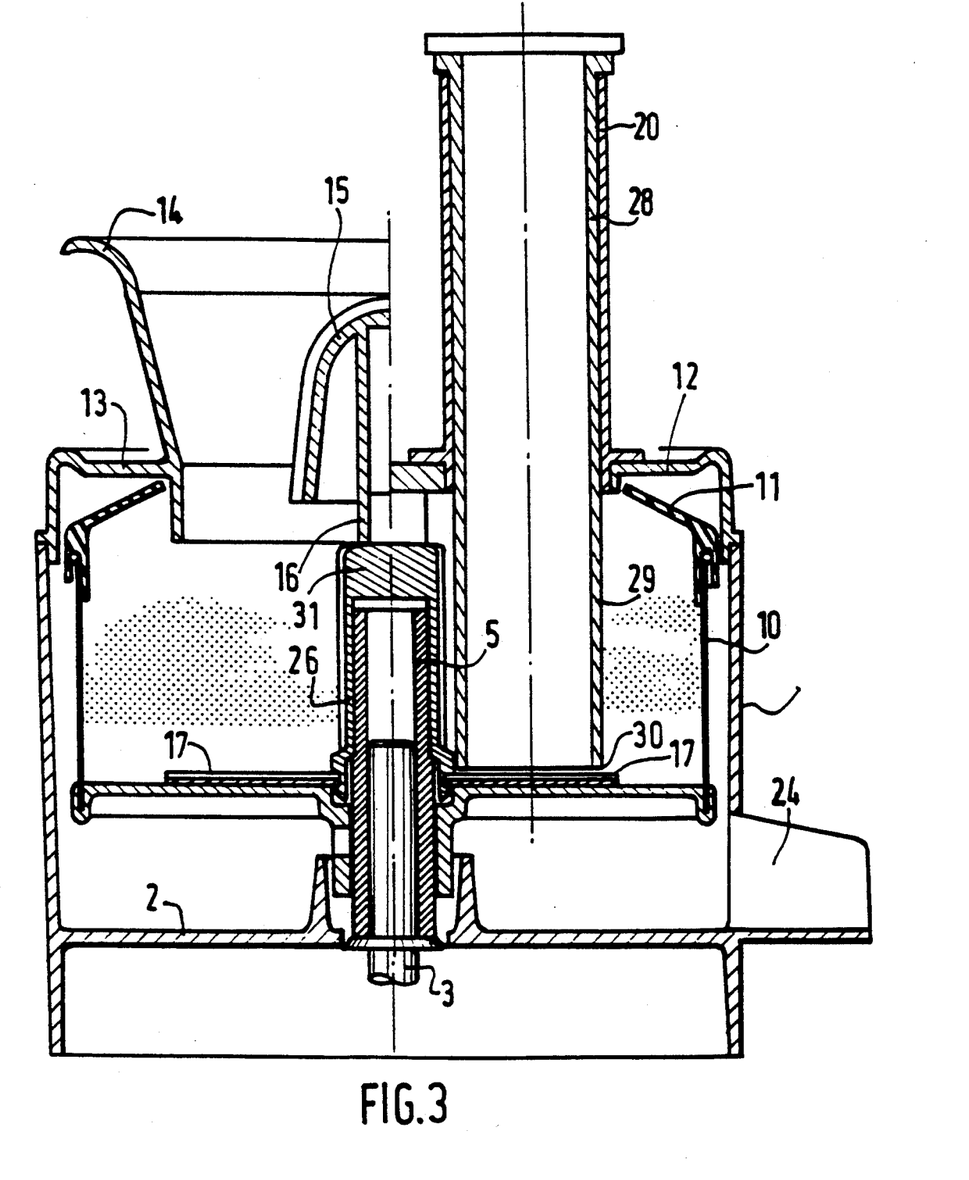
FIG. 3 comprises two half-section drawings, the righthand showing the use of the apparatus as a centrifugal device and the lefthand section the apparatus used as a citrus fruit squeezer/centrifugal separator.

To convert the device from use as a fruit-press as shown in FIG. 2 to a centrifugal separator or squeezer as shown in FIG. 3, the lid (12) is removed, followed by the process tool (7), the spindle (5) and the container formed by the assembly comprising items (9), (10) and (11). The spindle (5) is then turned around and fitted once again to the shaft (3). Because of this inversion, the pins (6) (of which only one is shown in the Figure) are now below the level of the disk (9) and this is now firmly attached to the spindle (5). This fact means that in the following operational sequence it will rotate, driven by the motor, naturally driving the strainer (10) along with it. The device will now operate as a centrifugal extractor.

The assembly configuration of the device operating centrifugally is shown here in FIG. 3 on the right. Onto the spindle (5) a sleeve (26) is fixed, the latter having an internal relief pattern fitting the relief pattern on the outside surface of the spindle (5). The sleeve (26) has on its lower part and in the horizontal plane a grater (17) driven rotationally by the motor along with the disk (9) and strainer (10) and at the same speed. However, in order to extract juice centrifugally from fruit and vegetables, these must first be disintegrated. To achieve this they must be directed immediately toward the surface of grater (17). If this is not the case, they risk being driven immediately against the strainer surface (10) and juice extraction would not be complete. For this reason, inside the funnel (20) in the lid (12) a liner or sheath (28) is fitted which extends inside the bowl, this extension being numbered (29), to a point (30) just above the disk (17). The products to be processed are therefore initially grated and then ejected by centrifugal force toward the side (10) serving as a strainer separating the juice or pulp from the skin and stones or pips, these items remaining within the process bowl.

The juice also falls to the bowl bottom (2) where it is drained off via outlet (24). It is however possible to collect the juice in the bowl itself. Naturally, since the container assembly is in very rapid rotation, the seal (11) must not press against the inner surface of the lid. To ensure this, it is a distinctive feature of this invention that the seal (11) may take up two positions on the upper part of strainer (10): a raised position in which it is in contact with lid (12) (for use as a juice extractor of press type) and in lowered position in which its top is at a lower level than the inner face of lid (12) (use as a centrifugal juice extractor). Where the device is being used as a citrus fruit squeezer, the problem of the seal contact (11) is solved by using a special lid (13). The inner edge of the seal (11) located within the bowl possesses two series of openings (not shown), which may number three for example, distributed at two different levels and which in conjunction with studs (not shown) on the upper section of the strainer allow assembly at the desired two different levels to be achieved.

When the device is assembled for use as a centrifugal juice extractor or fruit squeezer, the seal (11) is not absolutely necessary. In fact, the force exerted on the particles of fruit or vegetable is basically along a radial axis. But the presence of the seal is nevertheless desirable, especially when it is angled as shown in the Figures to serve as a deflector returning toward the center particles which could have accumulated at the top of the strainer without being properly centrifuged.

Figure 4:
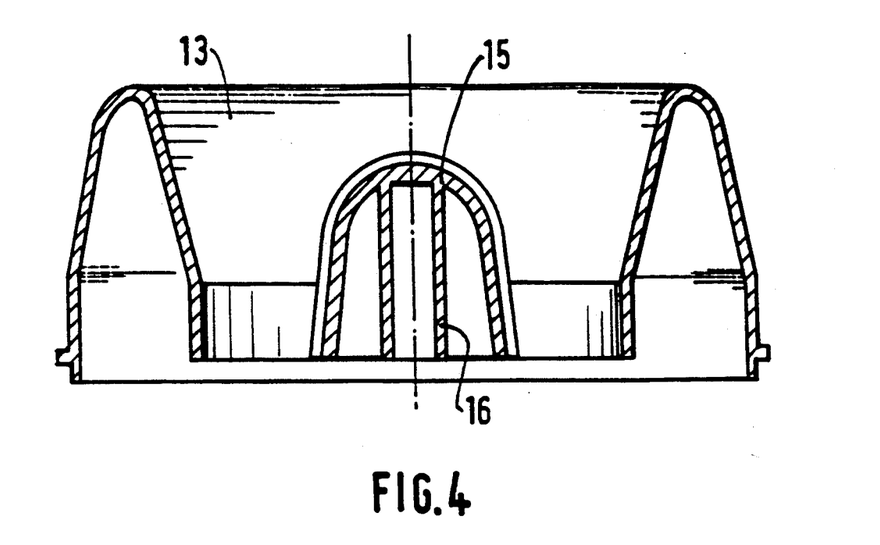
FIG. 4 shows the covering lid of the fruit press.

In order to use the device as a fruit-squeezer/centrifugal extractor as shown on the left of FIG. 3, it is necessary to remove the lid designated (12), replacing it with another lid (13) fitted with shaped funnel (14). The lid (13) represented in FIG. 4 is therefore open to the air over a large portion of its surface. For safety reasons a fixed grid (not shown) may be placed under the squeezer cone. To use the fruit-squeezer, it is necessary only to remove the lid (12) and to replace it with lid (13), inserting in part (26) the hub (16) of a squeezer cone (15). The centrifugal section of the machine may remain as assembled, but on sleeve (26) is fixed a squeezer cone (15) whose skirt (16) surrounds part (31) of the sleeve extension (26). The wrists may be rested on the edge of the shaped funnel (14) in this practical implementation of the concept of the invention, thereby guaranteeing correct positioning of the fruit. It is equally possible to use a lid (13) as represented in FIGS. 1 and 4. As mentioned previously, the rotational movement of the squeezer cone enables ejection from the outer skin of the citrus fruit first the juice, secondly the fruit pulp and finally the pips or stones. In this assembly configuration, the whole falls initially onto the disk (17) which causes by centrifugal force the matter extracted from the fruit skin to be projected onto the strainer surface (10).

Figure 6:
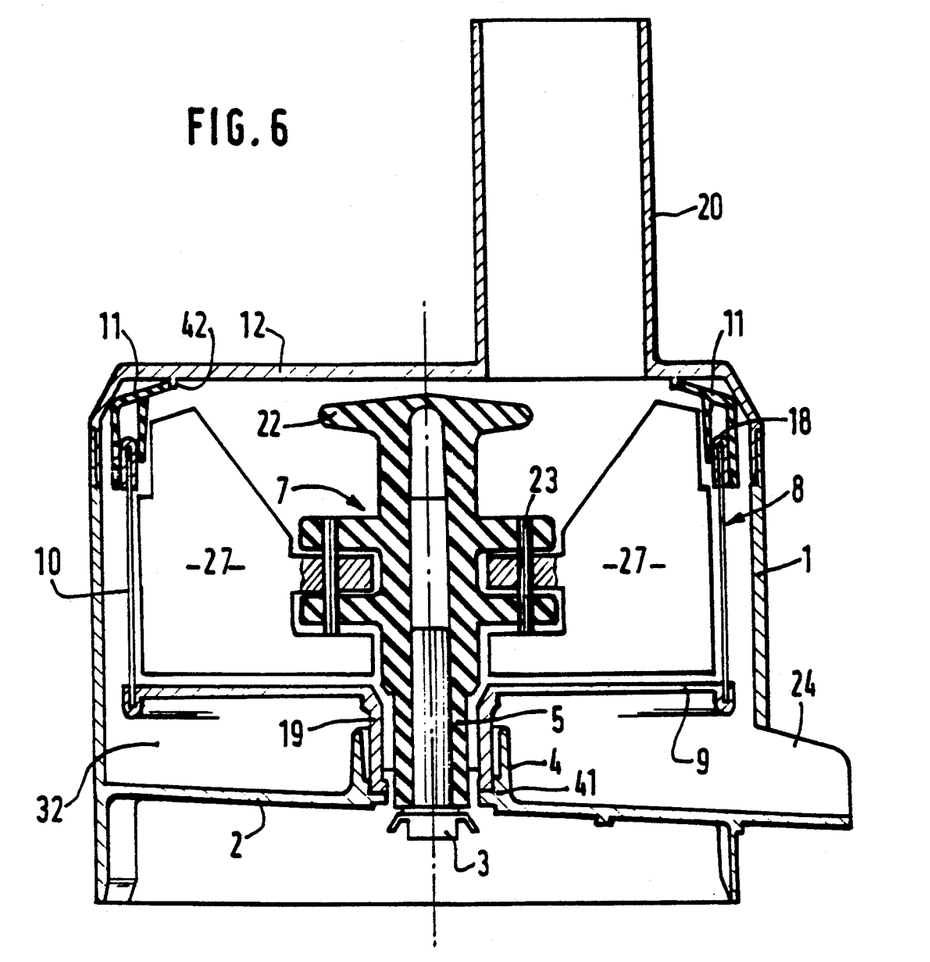
FIG. 6 is a vertical section of the upper part of the machine when operating as a fruit juice extractor of press type.

In FIG. 6, which shows a device used as a fruit-press, the process tool is a rotor (7) rotating within a vertical cylindrical strainer (10). On the upper section of this strainer (10) is a rolled edge (18) onto which can be fitted a seal (11). In all assembly configurations the tools are attached to the driving shaft (3) by means of spring catches.

Figure 7:
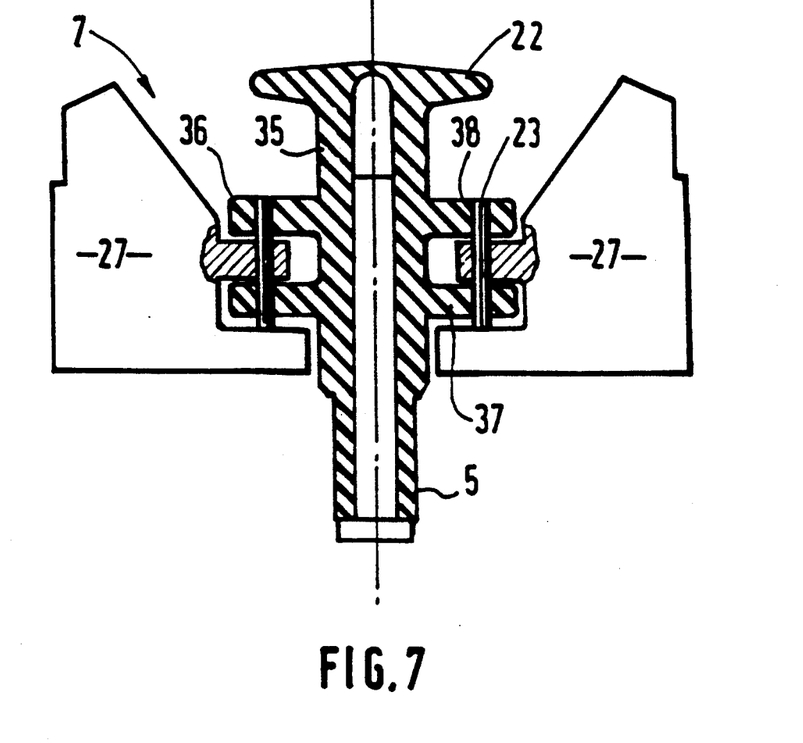
FIG. 7 is a front view of a rotor.
Figure 8:
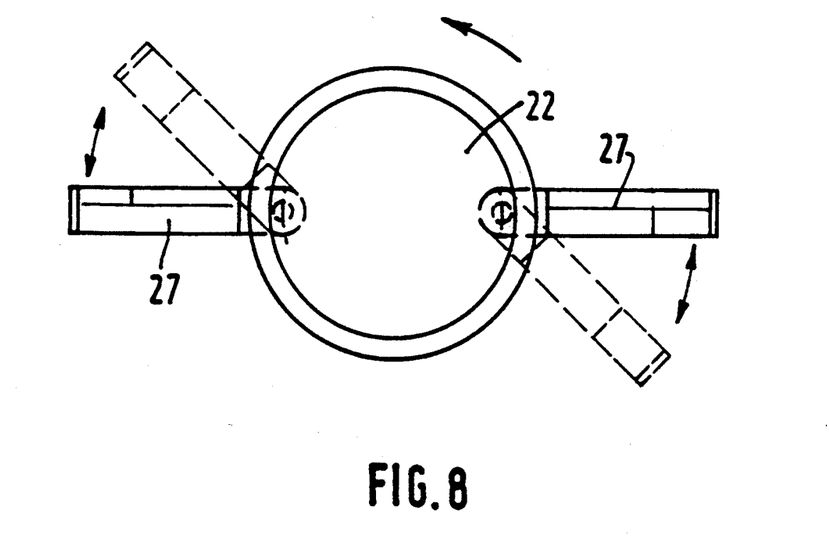
FIG. 8 is a top view of the same rotor.

FIGS. 7 and 8 illustrate the rotor (7), firstly in vertical section and secondly in top view. The main body (35) of the rotor is hollow and has at the lower end a spindle (5) intended to fit onto the driving shaft (3) inside the central tube (4). At its upper end is a cap (22) which is intended to facilitate handling of the process tool for removal from the shaft (3). Below the cap (22) are two lugs (36) and (37) in which are two holes (38) through which are inserted the pivot pins (23) of two rotor blades (27). These blades are constructed so that their centers of gravity are as distant as possible in order to maximize the effect of centrifugal force; this means in effect that the blades (27) are thicker, and may be denser, at their ends than near their pivot pins.

It is an advantage for the rotor blades (27) to be free-moving around their pins (23). This is because when not driven they may take up any position in relation to these pins (shown by dotted lines on FIG. 8). When, however, the process tool is driven rotationally, centrifugal force causes them to take up positions along a radial axis, in other words, they are diametrically opposed one to the other (this position is indicated by the continuous lines in FIG. 8). This arrangement confers a substantial advantage. During juice extraction it is frequently the case that one of the rotor blades (27) has a heavier load of pulp or residue than the other. This situation results in vibrations which compromise the efficient operation of the machine. The freedom of movement of the blades (27) around their respective pivot pins (23) enables them to be self-adjusting and when one is more loaded than the other, it will take up a position at an angle to the rotor axis, freeing part of its pulp. The other blade carries out its task of pressing the pulp and the residues, gradually accumulating an increasingly heavy load of these until equilibrium is re-established. The problem of vibration is easily solved in this way. Naturally, the rotational speed of the rotor in this case is approximately 1500 rpm in order to attain the centrifugal force required for juice extraction. The rotor blades or lobes (27) are preferably raked from bottom to top at an angle varying as necessary from 6 to 12 degrees so that the matter to be processed, which will normally fall to the bottom of the extraction container, is brought back up by the rotation of the process tool in order to ensure that all the entire strainer surface is used.

In the example illustrated by FIGS. 9 to 12, the rotary component is formed by the container (10) of a centrifugal extractor. This container rotates inside a bowl (not shown) of which the bottom (2) with central orifice (1) is the only part illustrated; inside this bowl is the projecting end of the driving shaft (3) surrounded by a central tube (4).

Figure 9:
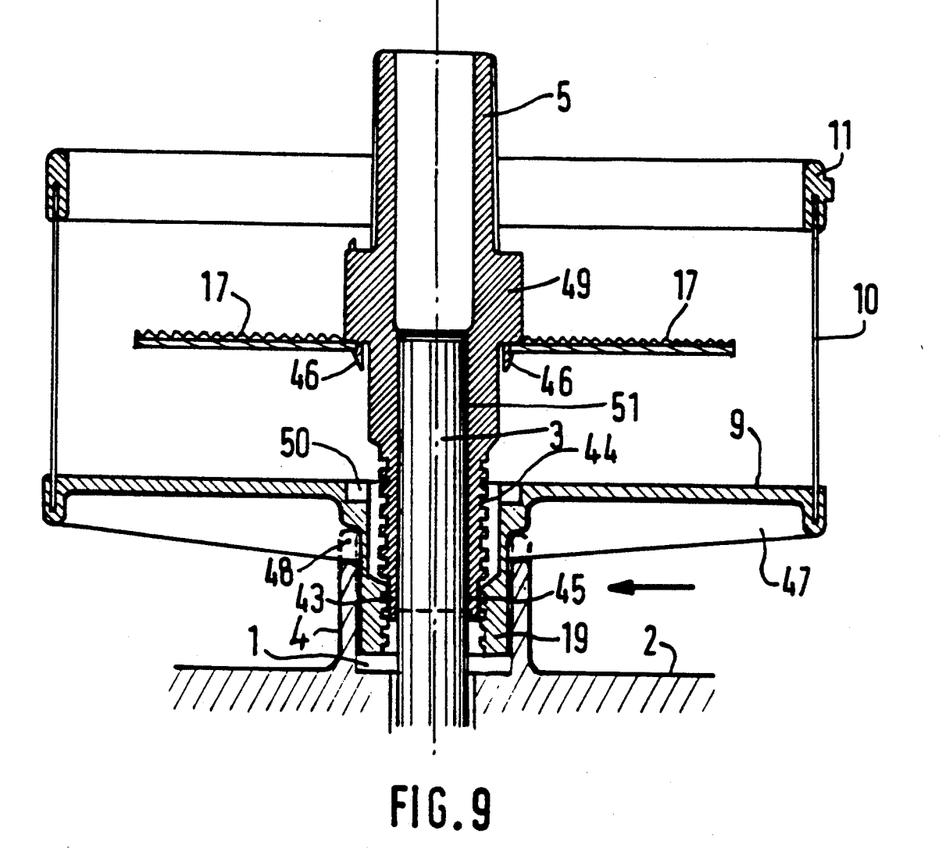
FIG. 9 shows the general arrangement in vertical section before the motor is started.

The centrifugal strainer (10) includes a hub (19) serving to ensure that it can be driven rotationally. Onto the driving shaft is placed a spindle (5) whose bottom end inserts freely into the internal screw thread (43) of the strainer (19). This spindle (5) itself possesses above a skirt (45) a threaded section (44). In addition, the spindle (5) is equipped with spring catches consisting of elastic tabs serving to fix the grater disk in position (17).

Known as such, the spindle (5) possesses a central bore (51) whose lower end may have one or two machined flats or a polygonal form in order to ensure that the spindle is driven by the driving shaft (3) without slippage. The skirt (45) is equipped with spring catches (not shown) for fitting onto the driving shaft.

As shown in FIG. 9, the container (10) has reinforcing ribs on its lower section (47). In addition, the central tube (4) possesses slots (48) on its upper section (see FIG. 12) in which the ribs (47) of the strainer (10) may fit.

Therefore, when at the beginning of the extraction process the housewife places the process container (10) inside the workbowl, the ribs (47) slot without difficulty between the raised ridges (48) and the container rests as placed on the upper end of the central tube (4). The housewife then introduces the spindle (5) inside the hub (19) of the process container (10), the spindle skirt (45) entering the internal thread (43) of the hub (19) but without being taken up by the thread (43) and the grater (17).

The device operates as follows. From the initial position shown in FIG. 9, in which the different component parts are simply placed one on another, when the motor is started, its rotation running for example in an anti-clockwise direction, causes, if the thread (43) of the hub (19) has the same orientation, that is to say if the thread is left-handed, the thread (44) to screw into the thread (43) in the hub (19) while the strainer is immobilized by the slot ridges (48). Subsequently, the spindle (5) screws into the hub (19) of the container (10) and descends rapidly along the central axis so that the lower end of the skirt (45) comes up against the driving shaft.

Figure 10:
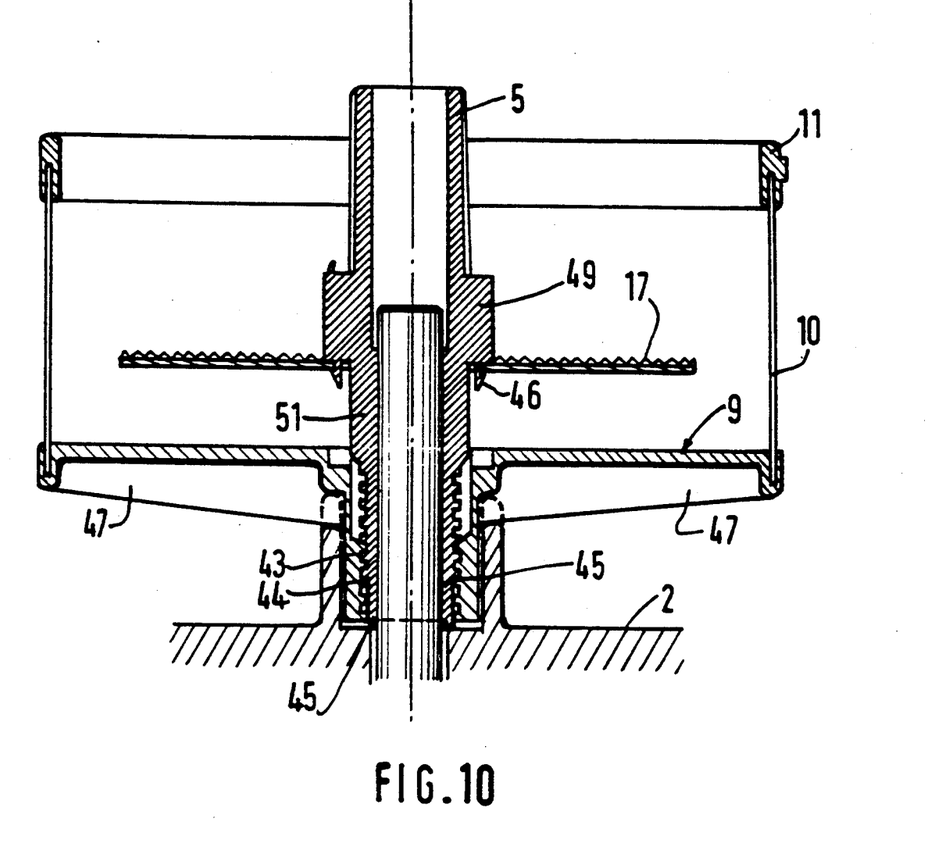
FIG. 10 is also a vertical section of the overall arrangement, after the motor is started.
Figure 11:
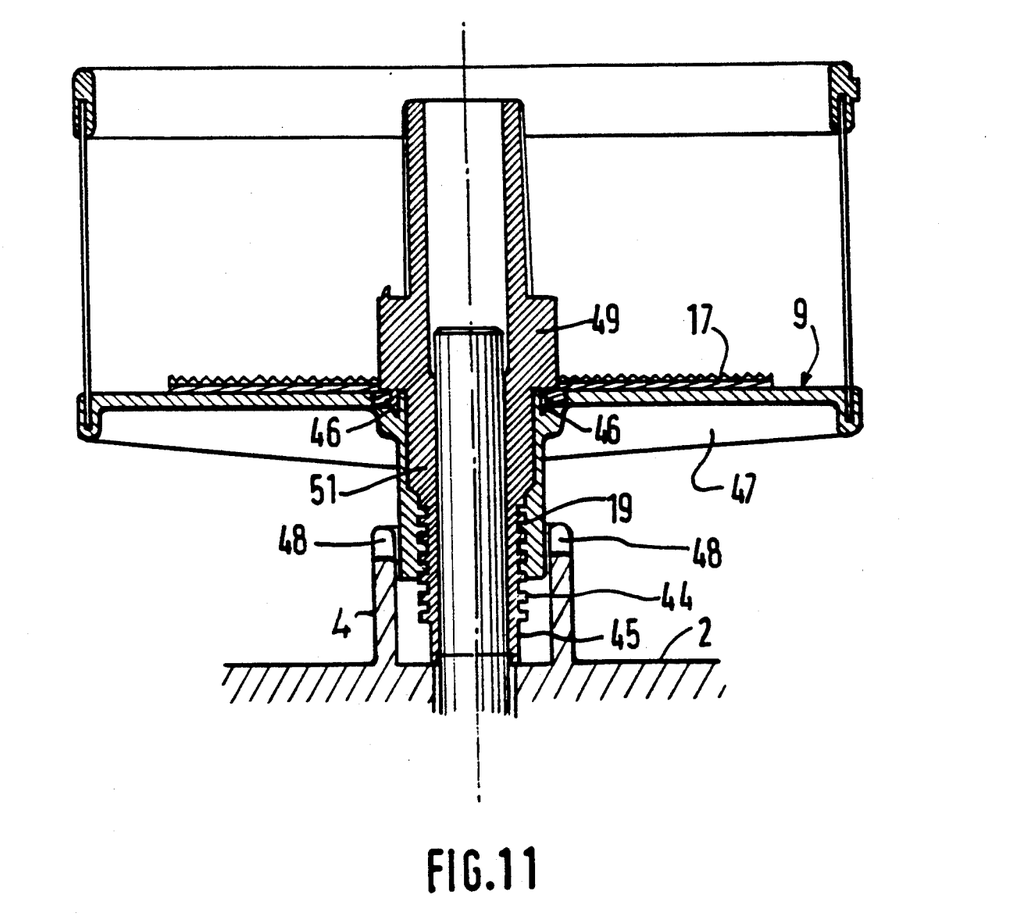
FIG. 11 is a vertical section of the device in operational state.
Figure 12:
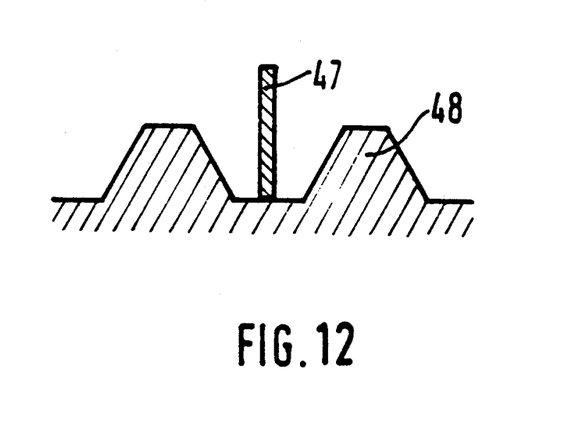
FIG. 12 is a detail view of a rib within the slotted collar of the device's skirt.

This position is illustrated in FIG. 10. However, from this moment on, the spindle (5) continues turning in the same direction. The result is that the hub (19) is in turn driven rotationally in this same direction and screws onto the spindle (5). This screw movement causes the process container (10) to be raised, freeing its ribs (47) from the slots (48) in the skirt (3). The process container (10) can then begin to rotate and it rises along the spindle until the bottom (9) of the container (10) comes up against the sleeve (49) of the spindle (5). A circular groove (50) allows the central part of the disk (17) and the spring catches (46) to enter. In this way, the spindle (5) and the process container (10) spin at the same speed and in the same direction as the driving shaft (3). This position is illustrated in FIG. 11. Finally, it is the height of the threaded sections which determines the level of the rotary process tool within the bowl (2).

When the food processing is at an end, the motor is stopped and the assembly composed of the spindle (5), and the container (10) is removed from the process bowl for cleaning. The spindle can easily be removed from the process container (10) by pulling lightly and then turning.

It is of course important that threads (43) and (44) should be "fast", such that only a fraction of a second is necessary for the descent at the spindle 5 and the rise of the hub (19) on the spindle (5).

It may be said as a simple illustration that satisfactory results have been obtained with a motor operating at 1500 rpm and with threads (43) and (44) both being of flat type, pitch 10 and left-handed, the thread being reduced to two flat threads.

The mechanism described above may be used for any rotary component possessing a hub fitting over a removable spindle.

It is unnecessary to add that numerous variations may be made without diverging substantially from the invention as described.

We claim:

1. A device for the extraction of juice and pulp from vegetable and fruit products comprising a supporting base enclosing an electric motor, a bowl having a cylindrical wall, said bowl being adapted to be removable from the supporting base, said motor having a drive shaft which projects into the interior of the bowl and is adapted to receive a fruit squeezer cone or a grater, said rotor blades, fruit squeezer cone and grater each of which having a central hub, said drive shaft being surrounded by a central tube, said device further comprising a lid capable of being fastened to said bowl, and a cylindrical strainer having a vertical wall surface parallel to the cylindrical wall of said bowl, said strainer being equipped with a skirt which fits inside the central tube surrounding drive shaft but without coming into contact with said drive shaft, said strainer having a spindle which is fitted to the drive shaft in two orientations, one in which the strainer remains static during operation and the other in which the strainer is driven rotationally when the drive shaft is itself turning, said spindle being fastened to said drive shaft by spring catches, said spindle having pins intended to operate in conjunction with grooves present in the central hub.

2. A device according to claim 1 further comprising a removable lid.

3. A device according to claim 1 wherein said rotor blades extend to a point near the strainer walls.

4. A device according to claim 3 wherein said rotor blades are angled.

5. A device according to claim 1 wherein said strainer is driven rotationally by the spindle.

6. A device according to claim 4 wherein said rotor blades are at an angle of between 6 and 12 degrees.

* * * * *